(No Model.) 2 Sheets—Sheet 1.
J. E. LOAFMAN.
COMBINED COTTON AND CORN PLANTER.
No. 326,756. Patented Sept. 22, 1885.
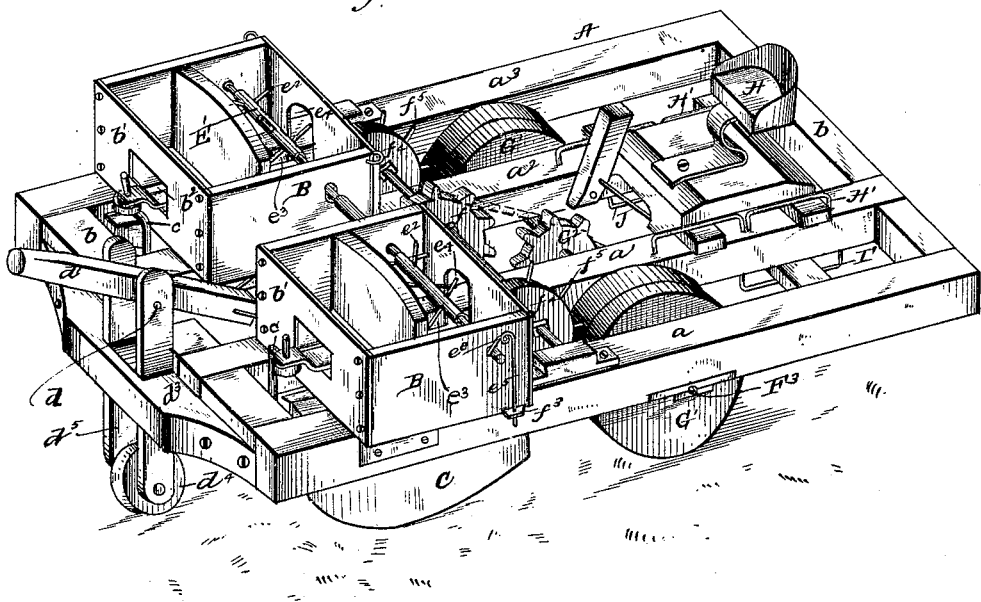
WITNESSES
C. W. Dashiell
E. G. Siggers
John E. Loafman
INVENTOR
By, C. A. Snow & Co.
Attorneys

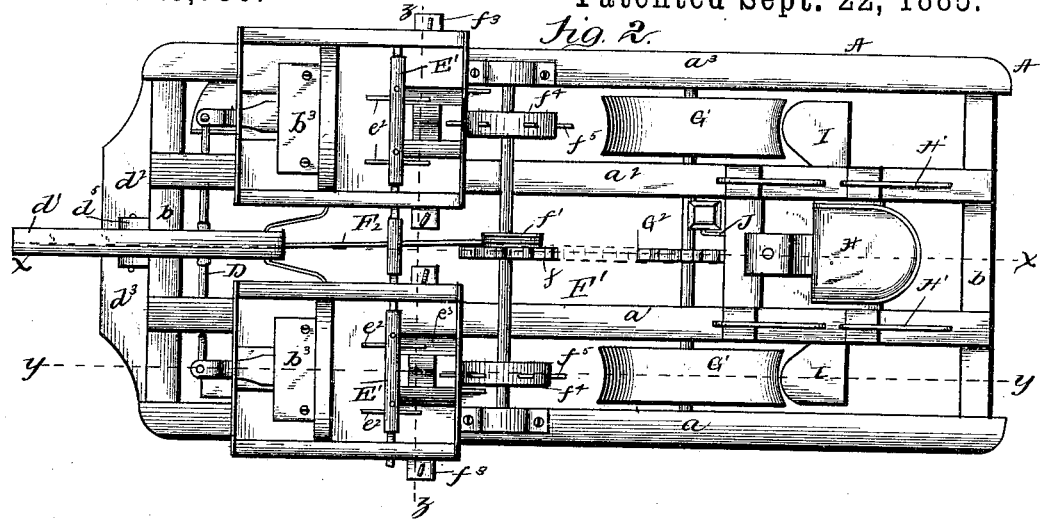

UNITED STATES PATENT OFFICE.

JOHN E. LOAFMAN, OF LIBERTY HILL, TEXAS.

COMBINED COTTON AND CORN PLANTER.

SPECIFICATION forming part of Letters Patent No. 326,756, dated September 22, 1885.

Application filed August 5, 1884. (No model.)

*To all whom it may concern:*

Be it known that I, JOHN E. LOAFMAN, a citizen of the United States, residing at Liberty Hill, in the county of Williamson and State of Texas, have invented a new and useful Combined Cotton and Corn Planter, of which the following is a specification, reference being had to the accompanying drawings.

My invention relates to a combined cotton and seed planter; and it has for its object to provide at a slight cost a machine which shall be simple in its construction, effective in its operation, and strong and durable.

With these ends in view the invention consists in the improved construction and combinations of parts hereinafter fully described, and pointed out in the claims.

In the drawings, Figure 1 is a perspective of a combined cotton and seed planter constructed in accordance with my invention. Fig. 2 is a plan view of the same. Fig. 3 is a longitudinal vertical section on the line $x\,x$ of Fig. 2. Fig. 4 is a longitudinal vertical section on the line $y\,y$ of Fig. 2, and Fig. 5 is a transverse section on the line $z\,z$ of Fig. 2.

In the accompanying drawings, in which like letters of reference indicate corresponding parts in all the figures, A represents the frame, which consists of the longitudinal parallel beams $a\,a'\,a^2\,a^3$ connected at their front and rear ends by means of cross-beams $b$.

B represents the seed-boxes, which are arranged at the forward end of the frame. Said boxes are divided into two compartments each, the rear compartments being employed for containing the cotton-seed. The front walls of the forward compartments, $b'$, are formed with openings $b^2$, through which openings extend the forward ends of the seed-dropping slides, said seed-slides being flush with the floor of the hoppers or boxes, and sliding in recesses or seats upon said floor. The rear ends of said seats are covered by strips $b^3$, so that the seed cannot drop until the slide has moved forward. When it is moved forward, the seed drops into an opening in said slide, which draws it rearwardly and drops it through an opening in the floor into a shoe, C. This shoe C is pointed at its forward end, and is adapted to open the furrow. The rear end of the shoe is open so that the seed can drop into the furrow, said shoe guiding it and preventing it from scattering. Upon the under side of the frame, at the forward end thereof, is journaled a crank-shaft, D, the ends of which extend up between the parallel beams, and are bent to form shoulders $c$. Fitted upon the ends of this crank-shaft are the plates or seed-slides, which have openings at their forward ends for the passage of said ends, the shoulders on the ends of the crank-shaft serving to support the ends of the seed-slides. Between the two middle parallel beams, near their forward ends is provided a shaft, $d$, upon which is pivoted a lever, $d'$. Secured to the forward end of the frame is a strip, $d^2$, having a vertical slot or opening, $d^3$, in which is adapted to slide a guide-roller, $d^4$, which is mounted in a bracket, $d^5$. Said bracket $d^5$ is divided at its upper end, and between said divided end the lever $d'$ is pivoted, said lever being employed to raise and lower said bracket and guide-roller. The roller is to be employed in planting cotton only, and when corn is to be planted it is raised.

F' represents a shaft which is mounted upon the upper side of the frame just in rear of the seed boxes or hoppers. On this shaft, at about midway the length of the same, is mounted a sprocket-wheel, $f$, and adjacent to said sprocket-wheels is eccentrically keyed upon said shaft a disk, $f'$, having a groove upon its peripheral edge. Connecting said eccentric disk with the crank-shaft D is a rod, $F^2$, which is bent around the disk $f'$, and rests in the groove thereof. It will be seen that as the shaft F' is turned it will turn the eccentrically-mounted disk, which will in turn actuate the crank-shaft, imparting a reciprocating motion to the same, and in this manner move the seed-slides to drop the corn.

As stated, the hoppers are divided into two compartments, the rear compartments being used for cotton.

Extending through the cotton-seed boxes is a shaft, E', having a series of stirrer-arms, $e^2$. There are holes or openings $e^3$ provided in said seed-boxes, and also openings $e^4$ in the rear walls of the same. Just below the openings $e^3$ are provided slides $f^3$, the inner ends of which are bent downwardly, while their outer ends extend beyond the sides of the hopper, and are each provided with a hole or opening. Fitting in said holes or openings are the ends of rods $e^5$, the upper ends of which are bent to form a spring, $e^6$.

Mounted upon the shaft $F'$ are two disks, $f^4$, which are provided with a series of pickers, $f^5$, which, when the shaft $F'$ is revolved, extend into the cotton-seed compartments through the openings $e^4$ in the rear walls thereof. It will be seen that as said stirrer-shafts push the seed down they will open the slides to permit its dropping, and as the seed is pushed down it revolves the stirrer-shaft $E'$, which aids in feeding said seed. Near the rear end of the frame is mounted a shaft or axle, $F^3$, upon which is mounted the carrying-wheels $G'$. Between the two inner longitudinal beams upon the shaft $F^3$ is mounted a sprocket-wheel, $G^2$, which is connected with the sprocket-wheel $f$ by means of a sprocket-chain. It will thus be seen that as the carrying-wheels revolve the stirrer-shafts or slides for dropping the seed are actuated.

H represents a seat which is mounted to slide in guides $H'$, whereby the weight of the operator may be shifted. Upon the under side of the frame, near the rear end thereof, is a scraper, I, which slides in brackets $I'$. A lever is pivoted to the inner side of the frame, and said lever is connected with the scraper by means of a rod, J.

The operation is as follows: When it is desired to plant cotton, the key is removed from the eccentric disk, thus allowing the shaft or axle to turn without moving the same. It will be seen that by this arrangement the cotton-planting mechanism will be actuated while the seed-planting mechanism will not be moved.

In using the machine for planting seed the keys or splines are removed from the stirrer-disks, thus allowing the shaft to turn without moving the same, thus actuating the seed-dropping mechanism, while the cotton-dropping slides and stirrer-shafts remain stationary.

It will be seen that the stirrer-shafts $E'$ push the seed down the hopper toward the openings $e^3$, causing the latter to be filled and the seed to rest upon the slides $f^3$, which meet together just below these openings. As the shaft $F'$ is revolved the disks $f^4$ are turned to cause their picker-arms $f^5$ to work through the openings $e^4$ $e^3$ and strike the slides $f^3$ at the point where they meet together. This action forces the seed in the openings $e^3$ down between the ends of the slides $f^3$, the latter being opened or actuated in a lateral direction to allow the depositing of the seed within the shoe C. The springs $e^6$, which are connected with the slides $f^3$, allow the same to return to their normal positions, Fig. 5, and to be held there until they are struck again by the next picker-arm $f^5$ of the disks $f^4$.

Having fully described my invention, what I claim as new, and desire to secure by Letters Patent, is—

1. The main frame, the hopper having the openings $e^3$ $e^4$, and the stirrer-shaft located within the hopper and arranged to force the seed down into the openings $e^3$, in combination with the slides $f^3$, working between the hopper and the frame, and having their inner ends curved downward and coming in contact with each other beneath the openings $e^3$, the outer ends of the slides being extended beyond the frame, rods $e^5$, fitted in the extended ends of the slides $f^3$, and having springs $e^6$ formed on the rods, a shaft, $F'$, mounted on the frame in rear of the hopper, disks $f^4$, mounted on the shaft and carrying a series of picker-arms, $f^5$, and the carrying-wheels connecting with the shaft $F'$ to actuate the same, arranged and operating whereby the contact of the picker-arms with the slides $f^3$ cause the latter to work laterally to drop the seed received from the hopper through the openings $e^3$, the spring-rods $e^5$ serving to return the slides to their former positions until again acted upon, for the purpose set forth.

2. The main frame, hopper, and openings $e^3$ $e^4$ provided in the latter, in combination with the seed-slides $f^3$, working in guides between the frame and the bottom of the hopper, the inner ends of the slides being curved or bent so as to come in contact with each other, springs for returning the slides to their former positions, a shaft carrying disks, and picker-arms located on the disks to work through the openings $e^4$ and force the seed in the openings $e^3$ through the seed-slides, the latter being actuated in a lateral line to allow the seed to be dropped, as set forth.

In testimony that I claim the foregoing as my own I have hereto affixed my signature in presence of two witnesses.

JOHN E. LOAFMAN.

Witnesses:
JOHN T. CHAPMAN,
SAN C. WARD.